United States Patent
Hanson

(10) Patent No.: US 8,067,103 B2
(45) Date of Patent: *Nov. 29, 2011

(54) OPTICAL ARTICLES WITH THIN HYDROPHOBIC LAYERS

(75) Inventor: Eric L. Hanson, San Diego, CA (US)

(73) Assignee: Aculon, Inc., San Diego, CA (US)

(*) Notice: Subject to any disclaimer, the term of this patent is extended or adjusted under 35 U.S.C. 154(b) by 1131 days.

This patent is subject to a terminal disclaimer.

(21) Appl. No.: 11/895,484

(22) Filed: Aug. 24, 2007

(65) Prior Publication Data

US 2008/0049326 A1 Feb. 28, 2008

Related U.S. Application Data

(60) Provisional application No. 60/839,809, filed on Aug. 24, 2006.

(51) Int. Cl.
*B32B 7/04* (2006.01)
*B32B 7/10* (2006.01)
*B32B 18/00* (2006.01)
*B32B 27/06* (2006.01)

(52) U.S. Cl. ........ 428/702; 428/420; 428/422; 428/689; 428/704; 428/432; 428/469; 428/470; 428/412; 428/423.1; 428/457; 428/458; 428/461; 428/474.7

(58) Field of Classification Search .................. None
See application file for complete search history.

(56) References Cited

U.S. PATENT DOCUMENTS

| | | | | |
|---|---|---|---|---|
| 3,787,351 A | | 1/1974 | Olson | 260/40 R |
| 4,539,061 A | * | 9/1985 | Sagiv | 156/278 |
| 5,106,561 A | * | 4/1992 | Singh et al. | 264/165 |
| 5,139,879 A | | 8/1992 | Aharoni et al. | 428/422 |
| 5,166,000 A | * | 11/1992 | Singh et al. | 428/428 |
| 5,204,126 A | * | 4/1993 | Singh et al. | 425/412 |
| 5,219,654 A | * | 6/1993 | Singh et al. | 428/336 |
| 5,392,156 A | | 2/1995 | Kumagai et al. | 359/586 |
| 5,766,698 A | * | 6/1998 | Singh et al. | 427/601 |
| 5,846,650 A | | 12/1998 | Ko et al. | 428/336 |
| 5,897,918 A | * | 4/1999 | Singh et al. | 427/352 |
| 6,171,652 B1 | * | 1/2001 | Singh et al. | 427/255.6 |
| 6,395,341 B1 | * | 5/2002 | Arakawa et al. | 427/419.1 |
| 6,455,142 B1 | | 9/2002 | Heberger et al. | 428/215 |
| 6,645,644 B1 | * | 11/2003 | Schwartz et al. | 428/632 |
| 6,734,227 B2 | | 5/2004 | Jing et al. | 523/210 |
| 6,737,145 B1 | * | 5/2004 | Watanabe et al. | 428/64.4 |
| 6,881,445 B1 | * | 4/2005 | Arora | 427/248.1 |
| 6,890,987 B2 | * | 5/2005 | Arora et al. | 524/588 |
| 6,902,791 B2 | | 6/2005 | Kawasato et al. | 428/141 |
| 6,905,754 B2 | | 6/2005 | Jing et al. | 428/142 |
| 6,960,387 B2 | | 11/2005 | Suzuki et al. | 428/336 |
| 6,965,001 B2 | * | 11/2005 | Arakawa et al. | 525/474 |
| 6,969,166 B2 | * | 11/2005 | Clark et al. | 347/101 |
| 7,048,971 B2 | * | 5/2006 | Arora | 427/402 |
| 7,740,940 B2 | * | 6/2010 | Hanson | 428/412 |
| 7,901,777 B2 | * | 3/2011 | Hanson | 428/412 |
| 2004/0023048 A1 | * | 2/2004 | Schwartz et al. | 428/472.1 |
| 2007/0092735 A1 | * | 4/2007 | Bruner et al. | 428/432 |
| 2008/0131701 A1 | * | 6/2008 | Hanson | 428/412 |
| 2008/0248293 A1 | * | 10/2008 | Hanson et al. | 428/336 |

* cited by examiner

*Primary Examiner* — Vivian Chen
(74) *Attorney, Agent, or Firm* — William J. Uhl

(57) ABSTRACT

Optical articles such as ophthalmic lenses containing a thin hydrophobic surface layer of a fluorinated material adsorbed thereon are disclosed.

3 Claims, No Drawings

OPTICAL ARTICLES WITH THIN HYDROPHOBIC LAYERS

CROSS REFERENCE TO RELATED APPLICATION

The present application claims priority from U.S. Provisional Patent Application Ser. No. 60/839,809, filed Aug. 24, 2006.

FIELD OF THE INVENTION

The present invention relates to optical articles or devices having a surface layer that is resistant to smudging and dirt collection.

BACKGROUND OF THE INVENTION

Optical devices such as ophthalmic lenses and display devices typically comprise a polymeric substrate. The substrate is susceptible to dirt collection and smudging. The surface can be cleaned by wiping with a surfactant-treated cloth or paper towel, but the cleaning is temporary and the surface will become smudged in a matter of days requiring repeated cleaning.

Therefore, there is a need for optical articles having a surface that is hydrophobic (and/or oleophobic) which will be resistant to dirt collection and smudging on a more permanent basis.

The present invention addresses this issue by providing a thin hydrophobic layer that is adsorbed on the surface of the optical article. The surface layer is thin and does not affect the optical properties of the article. In one embodiment of the invention, the coating is designed to have a semi-permanent lifetime (e.g. 1-12 weeks for a cellular phone coating) in order to allow it to be deposited using a very simple and safe method. In another embodiment of the invention, a more permanent layer is deposited.

SUMMARY OF THE INVENTION

An optical article having a substrate and a thin hydrophobic surface layer of a fluorinated material adsorbed thereon. The surface layer has a thickness of less than 100 nanometers and a water contact angle greater than 70°. The fluorinated material is an amphiphilic perfluorinated hydrocarbon of the structure:

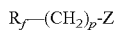

where $R_f$ is a perfluorinated hydrocarbon group in which the hydrocarbon group may be substituted with oxygen, such as a perfluorinated alkyl group or a perfluoroalkylene ether group, p is an integer of from 0 to 18, such as 0 to 4 and X is a polar group adsorbed on the surface of the substrate.

The hydrophobic layer being adsorbed on the substrate surface is not believed to be covalently bonded to the surface. Rather, the adherence to the surface is through physical attraction such as Van der Walls forces and/or hydrogen bonding.

In a particular embodiment, the invention provides a composition for application to a polymeric substrate such as a polycarbonate ophthalmic lens to make the substrate more hydrophobic. The composition comprises:

(a) a perfluorinated hydrocarbon of the structure:

where $R_f$ and p are as defined above and X is a carboxyl group, (b) a perfluorinated hydrocarbon of the structure:

where $R_f$ and p are as defined above and Z is a phosphorus acid group.

The combination of the perfluorinated hydrocarbons provides for a more durable hydrophobic layer on the substrate surface than that formed from component (a) alone.

The invention also provides for a method of depositing a hydrophobic fluorinated composition on a polymer substrate surface comprising:

(a) contacting the surface either directly or through an intermediate organometallic layer with a solution or dispersion of the composition described immediately above, followed by (b) coalescing the solution or dispersion to form a substantially continuous film or layer while removing diluent so as to adhere the composition to the polymer substrate or the intermediate organometallic layer.

DETAILED DESCRIPTION

The term "optical article" means an article that transmits or reflects visible light. Optical articles are typically transparent and can be formed from such materials such as glass and polymers. Examples of suitable polymers are polycarbonates, polyurethanes, polyamides, polyimides, polyesters such as polyethylene terephthalate, polyethylene naphthalate, acrylic polymers and copolymers, polysiloxanes, cellulose polymers such as cellulose triacetate. In many cases, the polymer has reactive or strongly interacting groups at the surface, such as aromatics, amides, carbonyls, siloxanes or silanes, nitriles, unsaturated bonds, hydroxyls, etc. Preferably, the polymer surface has carbonyl, amide, hydroxyl, ether or oxide groups. Specific examples of optical articles are ophthalmic articles such as those associated with eyewear such as prescription lenses, sunglasses, goggles and face shields. Examples of other optical articles are electrooptical devices such as display screens such as those associated with cathode ray tubes, light emitting diodes, liquid crystals and plasma screens. Other optical articles include mirrors, telescopes, binoculars and camera lenses.

The thin hydrophobic surface layer can be a fluorinated material that is adsorbed on the surface of the optical article. Examples of suitable fluorinated materials are amphiphilic perfluorinated hydrocarbons that are monomeric or oligomeric in nature having an actual or number average molecular weight of less than 2000. Such amphiphilic materials are those of the following structure:

where $R_f$ is a perfluorinated hydrocarbon group including an oxygen substituted hydrocarbon group, such as a perfluorinated alkyl group or a perfluorinated alkylene ether group and p is 0 to 18, preferably 0-4.

Examples of perfluoroalkyl groups are those of the structure:

where Y is F or $C_nF_{2n+1}$; m is 4 to 20 and n is 1 to 6.

Examples of perfluoroalkylene ether groups are those of the structure:

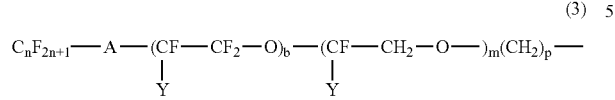 (3)

where A is an oxygen radical or a chemical bond; n is 1 to 6; Y is F or $C_nF_{2n+1}$; b is 2 to 20, m is 0 to 6, and p is 0 to 18, preferably 2 to 4 and more preferably 2.

X is a polar group that is adsorbed on the surface of the optical article and can be an acid or an acid derivative. By adsorbed is meant the hydrophobic layer is adhered to the substrate surface through physical forces such as hydrogen bonding and/or Van Der Wall forces and through little, if any, covalent bonding. Consequently, the hydrophobic layer is designed to have a projected lifetime of 1 to 12 weeks. Acid derivatives are functionalities that perform similarly as acid precursors such as acid salts and acid esters. Preferably, X is carboxyl of the structure:

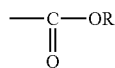 (4)

and R is hydrogen, perfluoroalkyl, alkyl or substituted alkyl containing from 1 to 50 carbon atoms.

Preferred fluorinated materials are esters of perfluorinated alcohols such as the alcohols of the structure:

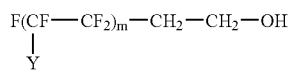 (5)

where Y is F or $C_nF_{2n+1}$; m is 4 to 20 and n is 1 to 6.

Examples of suitable esters are stearates and citrates of such alcohols. Such materials are available from E. I. du Pont de Nemours and Company under the trademark ZONYL FTS and ZONYL TBC.

The hydrophobic layer can be made more durable by using a combination of perfluorinated hydrocarbons. For example, for improving adhesion over polymer substrates such as polycarbonate ophthalmic lenses, the following composition can be used:

(a) a perfluorinated hydrocarbon of the structure:

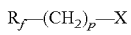

where $R_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage. Citrates and stearates are preferred ester groups.

(b) a perfluorinated hydrocarbon of the structure:

where $R_f$ and p are as defined above, preferably $R_f$ is a perfluoroalkylene ether group such as those described above, and p is from 2 to 4. Z is a phosphorus acid group. Examples of phosphorus acid groups are:

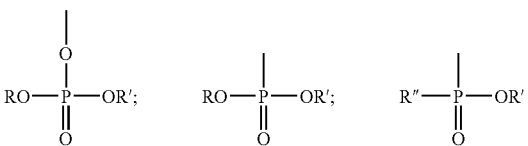

where R" is a hydrocarbon or substituted hydrocarbon radical having up to 200, such as 1 to 30 and 6 to 20 carbons, R" can also include the perfluoroalkyl groups mentioned above, and R and R' are H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Preferably, the phosphorus acid is a phosphonic acid, that is:

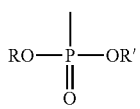

where R and R' are H.

Typically the weight ration of a:b is from 100:1 to 1:100.

For application to the surface of the substrate, the fluorinated material and the above-described composition hereinafter in the Detailed Description referred to as the "perfluorinated composition" is dissolved in a liquid diluent. The concentration of the fluorinated material and the perfluorinated composition is somewhat critical and should be no greater than 10, such as 0.01 to 10 percent by weight and preferably is within the range of 0.01 to 1.0 percent by weight based on weight of the composition. Amounts greater than 10 percent will be expensive and also provide a coating that will be excessively thick and interfere with the optical quality of the substrate.

Examples of suitable diluents are hydrocarbons such as hexane, isooctane and toluene; ketones such as methyl ethyl ketone; alcohols such as methanol and ethanol; ethers such as tetrahydrofuran. Fluorinated solvents such as nonafluorobutylmethyl ether and fluorinated solvents available as HFE-7100, supplied by 3M Innovative Products and perfluorinated ethers supplied by Solvay Solexis under the trademark GALDEN can also be used. Fluorinated solvents are preferred solvents and can be used in admixtures with the other solvents mentioned above. The fluorinated solvents or diluents are different from the fluorinated materials in that the fluorinated solvents or diluents are not film formers, whereas the fluorinated materials are. Preferably, the vapor pressure of the diluent is high, permitting rapid evaporation at room temperature (20-25° C.). The fluorinated material can be dissolved easily upon adding the fluorinated material to the diluent.

The solution of the fluorinated material and the perfluorinated composition can be applied to the surface of the optical article by spraying or wiping. After application the diluent is permitted to evaporate, with or without wiping during evaporation, preferably at ambient temperature, or optionally by the application of heat.

The resultant layer is thin, having a thickness less than 100 nanometers, typically 2 to 50 nanometers, and is hydrophobic, having a water contact angle less than 70°, typically from 75-130°. The water contact angle can be determined using a contact angle goniometer such as a TANTEC contact angle meter Model CAM-MICRO.

The perfluorinated composition can be applied directly to the substrate or can be applied indirectly to the substrate through an intermediate organometallic coating. The intermediate organometallic coating often provides better adhesion and durability of the subsequently applied layer derived from the perfluorinated composition.

The organometallic compound is preferably derived from a metal or metalloid, preferably a transition metal, selected from Group III and Groups IIIB, IVB, VB and VIB of the Periodic Table. Transition metals are preferred, such as those selected from Groups IIIB, IVB, VB and VIB of the Periodic Table. Examples are tantalum, titanium, zirconium, lanthanum, hafnium and tungsten. The organo portion of the organometallic compound is selected from those groups that are reactive with the acids (or their derivatives) of the perfluoroalkylene ether. Also, as will be described later, the organo group of the organometallic compound is believed to be reactive with groups on the surfaces being treated such as carbonyl, amide, hydroxyl, ether or oxide groups. Examples of suitable organo groups of the organometallic compound are alkoxide groups containing from 1 to 18, preferably 2 to 4 carbon atoms, such as ethoxide, propoxide, isopropoxide, butoxide, isobutoxide, tert-butoxide and 2-ethylhexyloxide. Mixed groups such as alkoxide, acetyl acetonate and chloride groups can be used.

The organometallic compounds can be in the form of simple alkoxides or polymeric forms of the alkoxide, various chelates and complexes, as well as partially hydrolyzed and/or condensed forms. For example, in the case of titanium and zirconium, the organometallic compound can include:

a. alkoxides of titanium and zirconium having the general formula $M(OR)_4$, wherein M is selected from Ti and Zr and R is $C_{1-18}$ alkyl, b. polymeric alkyl titanates and zirconates obtainable by condensation of the alkoxides of (a), i.e., partially hydrolyzed alkoxides of the general formula $RO[-M(OR)_2O-]_{x-1}R$, wherein M and R are as above and x is a positive integer, c. titanium chelates, derived from ortho titanic acid and polyfunctional alcohols containing one or more additional hydroxyl, keto, carboxyl or amino groups capable of donating electrons to titanium. These chelates have the general formula $$Ti(O)_a(OH)_b(OR')_c(XY)_d$$

wherein $a=4-b-c-d$; $b=4-a-c-d$; $c=4-a-b-d$; $d=4-a-b-c$; R' is H, R as above or X—Y, wherein X is an electron donating group such as oxygen or nitrogen and Y is an aliphatic radical having a two or three carbon atom chain such as i. —$CH_2CH_2$—, e.g., of ethanolamine, diethanolamine and triethanolamine, ii. 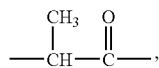 e. g., of lactic acid,

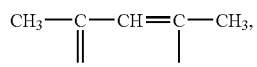

iii. e. g., of acetylacetone enol form, and

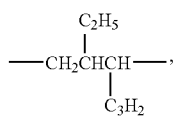

iv. e.g., as in 1,3-octyleneglycol, d. titanium acylates having the general formula $Ti(OCOR)_{4-n}(OR)_n$ wherein R is $C_{1-18}$ alkyl as above and n is an integer of from 1 to 3, and polymeric forms thereof, e. mixtures thereof.

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkylethers and diethylether.

Also, adjuvant materials may be present with the organometallic compound and the diluent (organometallic compositions). Examples include stabilizers such as sterically hindered alcohols, acids, surfactants and anti-static agents. The adjuvant materials are typically used in amounts of less than 50% of the weight of the nonvolatile components more typically up to 30% by weight based on weight of nonvolatile components. The use of the adjuvant materials is dictated by the level of effect intended; for example 10% triethanolamine may be added to the formulation to dramatically increase the water stability of the formulation, or 0.1% hydrochloric acid could be included to create a denser and more homogenous film after drying.

The concentration of the organometallic compound in the composition is not particularly critical but is usually at least 0.01 millimolar, typically from 0.01 to 100 millimolar, and more typically from 0.1 to 50 millimolar.

The organometallic treating composition can be obtained by mixing all of the components at the same time or by combining the ingredients in several steps. Since in many cases the organometallic compound is reactive with moisture, care should be taken that moisture is not introduced with the diluent or adjuvant materials and that mixing is conducted in a substantially anhydrous atmosphere.

The organometallic composition can be applied to the metal substrate surface by conventional means such as immersion coating such as dipping, rolling, spraying or wiping to form a film. The diluent is permitted to evaporate. This can be accomplished by heating to 50-200° C. or by simple exposure to ambient temperature, that is, from 20-25° C. It is believed that the resulting film is in the form of a polymeric metal oxide in multilayer form with unreacted alkoxide and hydroxyl groups. This is accomplished by depositing the film under conditions resulting in hydrolysis and self-condensation of the alkoxide. These reactions result in a polymeric coating being formed that provides cohesive strength to the film. The conditions necessary for these reactions to occur is to deposit the film in the presence of water, such as a moisture-containing atmosphere. The resulting film has some unreacted alkoxide groups and/or hydroxyl groups for subsequent reaction and possible covalent bonding with an overlayer material. However, for readily co-reactive groups, ambient temperatures, that is, 20° C., may be sufficient. Although not intending to be bound by any theory, it is believed the polymeric metal oxide generated by the use of a metal alkoxide under ambient conditions is of the structure:

$$[M(O)_x(OH)_y(OR)_z]_n$$

where M is the metal of the invention, R is an alkyl group containing from 1 to 30 carbon atoms; $x+y+z=V$, the valence of M; x is at least 1, y is at least 1, z is at least 1; x=V−y−z; y=V−x−z; z=V−x−y; n is greater than 2, such as 2 to 1000.

The resulting film typically has a thickness of 5 to 100 nanometers. For other applications, thicker films can be used. When the organometallic compound is used neat and applied by chemical vapor deposition techniques in the absence of moisture, a thin metal alkoxide film is believed to form. Polymerization, if any occurs, is minimized and the film may be in monolayer configuration. When the organometallic compound is subjected to hydrolysis and self-condensation conditions as mentioned above, thicker films are formed.

Although not intending to be bound by any theory, it is believed the acid groups of the perfluorinated composition either adsorb on or associate or bond with the oxide or hydroxyl groups on the surface of the substrate being treated or with the hydroxy or alkoxide groups of the organometallic coating. The perfluorinated compositions are believed to self-assemble with the fluoro group being oriented out and away from the surface of the substrate making the surface more hydrophobic.

As mentioned above, use of the intermediate organometallic coating results in a more durable layer. It is believed the alkoxide and hydroxyl groups of the organometallic coating form stronger bonds to the surface oxide and hydroxyl groups of the substrate than do the acid groups of the perfluorinated composition. Also, the acid-hydroxyl and acid-alkoxide group bonds associated with the perfluorinated composition and the organometallic coating are believed to be stronger than the acid-oxide/hydroxyl bonds associated with the substrate.

Although not intending to be bound by any theory, it is believed that the perfluorinated compositions described above form a self-assembled layer which may be at least in part a monolayer on the surface of the optical articles. Self-assembled layers or films are formed by the adsorption and spontaneous organization of the fluorinated material on the surface of the optical article. The fluorinated materials useful in the practice of the invention are amphiphilic molecules that have two functional groups. The first functional group, i.e., the head functional group, is the polar group X and Z in the structure (1) above and attaches to the surface of the optical article. The second functional group, i.e., the tail, as shown as $R_f$—$(CH_2)_p$ in structure (1) above is covalently bonded to the first functional group and extends outwardly from the surface of the substrate. In the case of the head group Z, it is believed there is covalent bonding to the surface of the substrate through reaction of the phosphorus acid groups with reactive groups on the substrate surface. It is believed this is the reason for the better durability associated with the hydrophobic layer deposited from the perfluorinated hydrocarbon containing the phosphorus acid groups.

The following Examples show the preparation of optical articles with various fluorinated materials in accordance with the present invention.

EXAMPLE 1

A 0.2% solution of the citrate ester of the perfluorinated alcohol

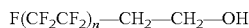

$F(CF_2CF_2)_n$—$CH_2$—$CH_2$—OH where n gives a homologue distribution of $C_6$ to $C_{18}$ available from E. I. duPont de Nemours and Co. as ZONYL TBC, was prepared in a 5:5:90 mixture of a fluorinated solvent HFE-7100 available from 3M Innovative Properties Co.: isopropanol:isooctane. This solution was sprayed onto a polysiloxane and polycarbonate piano lens surface and the solvent was allowed to evaporate. The hazy coating deposited was then gently wiped with a cotton cloth until no visible residues remained. A very thin (<100 nm), invisible coating was left behind. This coating was applied to a variety of plastic materials including polysiloxanes, poly(ethylene terephthalate), polyacrylates, polyurethanes, and polyimides. It was successfully applied on a wide range of substrates, including plano and prescription eyewear (including sunlenses), display screens such as computer monitor screens, personal data assistants, cell phones, and portable gaming devices.

The hydrophobic/oleophobic properties of this coating make it particularly useful for repelling fingerprints on electronic displays and eyewear and for shedding water from eyewear (e.g. for outdoor sports activities). The lifetime of these films has been judged (approximately 2-4 weeks) by abrasion testing (repeated rubbing/cleaning with microfiber cloth), chemical attack (immersion in synthetic perspiration), and removal by the elements (immersion in water). Removal of the coating was evaluated by observing changes in water contact angle.

Initial water contact angle for ZONYL TBC on polycarbonate/polysiloxane lens: 115°
10 rubbing cycles: 107°, 20 cycles: 98°, 30 cycles: 90°, 40 cycles: 86°
Immersion in deionized water, 18 hours: 103°
Immersion in artificial perspiration, 18 hours: 105°
Initial water contact angle for ZONYL TBC on polycarbonate lens: 114°
10 rubbing cycles: 111°, 20 cycles: 109°, 30 cycles: 105°, 40 cycles: 99°, 50 cycles: 89°
Immersion in deionized water, 1 hour: 110°
Immersion in artificial perspiration, 1 hour: 99°

EXAMPLE 2

In a manner similar to Example 1, the stearate ester of the perfluorinated alcohol (Zonyl FTS) of Example 1 was prepared in hexane. The solution was applied to a polysiloxane-hardcoated polycarbonate piano lens. Removal of the coating was monitored by the change in water contact angle after rubbing the surface with a microfiber cloth.

Initial water contact angle of Zonyl FTS on polycarbonate/polysiloxane lens: 105°
10 rubbing cycles: 103°, 20 cycles: 100°, 30 cycles: 98°, 40 cycles: 90°

EXAMPLE 3

In a manner similar to Example 1, 0.1% (w/v) of a perfluorinated phosphonic acid, poly(hexafluoropropylene oxide) monophosphonic acid was added to the solution of 0.1% (w/v) of the perfluorinated citrate ester as in Example 1. The solution was applied to a polycarbonate lens by spraying and allowed to dry. Removal of the coating was monitored by the change in water contact angle after rubbing the surface with a microfiber cloth.

Initial contact angle of the fluorinated phosphonic acid/citrate coating on polycarbonate lens: 108°
After 10 rubbing cycles: 104°, 20 cycles: 102°, 30 cycles: 102°, 40 cycles: 103°, 50 cycles: 103°

EXAMPLE 4

In a manner similar to Example 1, 0.1% (w/v) of a perfluorinated phosphonic acid, poly(hexafluoropropylene oxide) monophosphonic acid was added to the solution of 0.1% (w/v) of the perfluorinated citrate ester as in Example 1. A solution of 0.25% (v/v) tantalum (V) ethoxide in isopropanol was first applied to a polycarbonate lens having a polysiloxane hardcoat via an impregnated wipe. The solvent was allowed to dry, and then the perfluorinated phosphonic acid/citrate solution was applied to the lens by spraying and allowing most of the solvent to evaporate before wiping with a dry cotton cloth. Removal of the coating was, monitored by the change in water contact angle after rubbing the surface with a microfiber cloth.

Initial contact angle of hydrophobic coating on polycarbonate/polysiloxane lens: 117°

After 10 rubbing cycles: 118°; 50 cycles: 114°; 100 cycles: 113°; 250 cycles: 113°

The invention is now set forth in the following claims.

What is claimed is:

1. An optical article comprising:
   (a) a polymer substrate and adhered to the substrate surface
   (b) an organometallic film comprising a polymeric metal oxide with alkoxide and hydroxyl groups that eventually bond to the surface of the substrate and
   (c) adhered to the organometallic film a continuous film of a fluorinated composition that comprises a perfluorinated hydrocarbon of the structure:

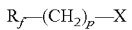

where $R_f$ is a perfluorinated hydrocarbon group or a perfluoroalkylene ether group, p is an integer ranging from 0 to 18, and X is selected from the group consisting of carboxyl and phosphorus acid;

the optical article being further characterized in that X is reactive with groups of the organometallic coating.

2. The optical article of claim 1 in which the metal of the organometallic film is selected from Groups IVB, VB, and VIB of the Periodic Table of Elements.

3. The optical article of claim 1 in which the polymeric metal oxide is of the structure:

where M is a metal, R is an alkyl group containing from 1 to 30 carbon atoms; $x+y+z=V$, the valence of M; x is at least 1, y is at least 1, z is at least 1; $x=V-y-z$; $y=V-x-z$; $z=V-x-y$; n is greater than 2.

* * * * *